(12) United States Patent
Fujioka et al.

(10) Patent No.: US 6,688,974 B2
(45) Date of Patent: Feb. 10, 2004

(54) COMPUTER-READABLE RECORDING MEDIA RECORDED WITH ACTION GAME PROGRAM, ACTION GAME CONTROL DEVICE AND METHOD, AND ACTION GAME PROGRAM

(75) Inventors: Kenji Fujioka, Suita (JP); Naoki Nishikawa, Kobe (JP); Hideto Inoue, Ashiya (JP); Hiroshi Miyaoka, Osaka (JP)

(73) Assignee: Konami Computer Entertainment Osaka, Inc., Osaka (JP)

( * ) Notice: Subject to any disclaimer, the term of this patent is extended or adjusted under 35 U.S.C. 154(b) by 119 days.

(21) Appl. No.: 10/033,048

(22) Filed: Dec. 27, 2001

(65) Prior Publication Data

US 2002/0094852 A1 Jul. 18, 2002

(30) Foreign Application Priority Data

Jan. 12, 2001 (JP) ........................................ 2001-004812

(51) Int. Cl.$^7$ ................................................. A63F 9/24
(52) U.S. Cl. ............................................ 463/2; 463/43
(58) Field of Search ............................... 463/1, 2, 3, 4, 463/7, 30, 31, 36, 37, 38, 43; 273/108.1, 108.2–108.4

(56) References Cited

U.S. PATENT DOCUMENTS 5,435,554 A * 7/1995 Lipson ........................... 463/3

FOREIGN PATENT DOCUMENTS

EP 0830881 3/1998

OTHER PUBLICATIONS

"PS2 Pawafaru Pro Yakyu 7" Review, 'Online! Jul. 6, 2000, XP002200048 Retrieved from the Internet: <URL:www.nc-sx.com/ncs070300/ncs0703th.htm> 'retrieved on May 24, 2002! *paragraph '0001!.

* cited by examiner

Primary Examiner—Kim Nguyen
(74) Attorney, Agent, or Firm—Jordan and Hamburg LLP

(57) ABSTRACT

Erroneous input is prevented on the event of input of instructions by a game player, which instructions are likely to change according to the state of a game character's abilities, while providing the player with a firm grasp of the state of abilities of the character. In a competitive action game which mimics baseball, among the players operating two connected portable game devices, the player engaged in defense is prompted to select a pitch type for pitching from a pitcher character 450 to a batter character 460. Here pitching ability data is set such that the pitcher character 450 can pitch, as breaking pitches, a sinker, curveball, or slider, with a curve width of 3, 1 and 5, respectively; based on this pitching ability data, the icons 403, 404, 405 are displayed in the vicinity of the strike zone display 410.

14 Claims, 6 Drawing Sheets

COMPUTER-READABLE RECORDING
MEDIA RECORDED WITH ACTION GAME
PROGRAM, ACTION GAME CONTROL
DEVICE AND METHOD, AND ACTION
GAME PROGRAM

BACKGROUND OF THE INVENTION

1. Field of the Invention

This invention relates to a technique for controlling an action game which causes a player to experience action in simulation, accompanying input of an instruction concerning the movement of a sphere, from the vicinity of a character displayed as an entity in the game space, to a prescribed location.

2. Description of the Related Art

In the prior art, competitive games are known in which a player competes with the CPU, or two players compete, at baseball, soccer, or some other sport in simulation, in a game space. Such competitive games are controlled by a single game device; players issue instructions to characters in the game space by pressing operating buttons on a prescribed controller, accompanied by display on a single display device connected to the game device.

In such game devices in which baseball competitions are held between two players, the game progress is controlled in such a manner that one player can specify, for each pitch, that a pitcher character in a game space mimicking a baseball ground throw a curve, forkball, or other pitch. Thereafter, game progress is controlled such that, based on these pitch specifications, the ball is displayed while moving from near the pitcher character toward the batter in the vicinity of home base (hereafter this may be referred to as pitch display processing), and the player who is the competitive opponent can instruct the batter character to swing the bat according to this display of the ball.

More specifically, in such competitive games, a plurality of operating buttons on the controller are associated with the plurality of pitch types which may be specified at the time the pitcher character pitches; and, one or more pitch types which can be pitched are set in advance for a single pitcher character. For example, the program can be set such that when the "Down" portion of a cross-shape button on the controller is depressed, the pitch thrown is a forkball. If the pitcher character, having received the pitch specification, is able to throw a forkball (whether this is possible or not is set in advance), then control is executed such that the prescribed pitch display processing is performed for a forkball pitch; if the pitcher character is not able to throw a forkball, the player is prompted to specify a pitch other than a forkball, accompanied by a display of the pitcher character shaking his head or by a similar gesture.

By this means, in conventional game devices, the player can specify pitch types according to the pitching capability of the pitcher character.

On the other hand, game systems are known in which a single competitive game is advanced by associating two character groups, competing in a game space, with two portable game devices (and with the players operating same), with the game system connected to the two portable game devices to send and receive the necessary data. These portable game devices have separate display units and operating buttons, and when playing against an opposing player, are designed such that the state of input to operating buttons, accompanied by display on the display units, remains concealed.

However, in the competitive games of conventional game devices such as described above, different magnitudes of change in the ball trajectory are associated with different pitches; and although the player can select among pitches which can be thrown by the pitcher character, mistaken instructions may be input due to an erroneous understanding of the pitch type and change in trajectory, and such mistaken input may influence the result of the baseball game, thereby detracting from the amusement afforded by the competitive game overall.

In particular, when using a portable game device such as described above, the display and operating button input on a player's device is concealed from the other player who is the opponent, and so a simpler method of display and input is desired.

This invention was devised in light of these considerations. An object of this invention is to provide a computer-readable recording media recorded with an action game program, an action game control device and method, and an action game program which can prevent erroneous input on the event of input of instructions by the player, which are likely to change according to the state of a character's abilities, while providing the player with a firm grasp of the state of abilities of the character.

SUMMARY OF THE INVENTION

In order to achieve the above object, according to the present invention, a computer-readable recording media recording an action game program which causes a game player to experience action in simulation, the action game program comprising the steps of: reading ability data including a plurality of abilities of the game character regarding movement of the ball; controlling trajectory of the ball according to the ability data; displaying the ball as it moves while changing the trajectory and icons corresponding to said plurality of abilities of the game character to control the movement of the ball; and allowing the game player to select one of said icons to input instruction relating to said movement of the ball.

In this action game program, icons corresponding to each of a plurality of abilities of a character which controls the motion of the ball, stored in memory in advance, are displayed based on ability data.

These and other objects, features and advantages of the present invention will become apparent upon reading the following detailed description along with the accompanied drawings.

DETAILED DESCRIPTION OF THE INVENTION

Figure 1:
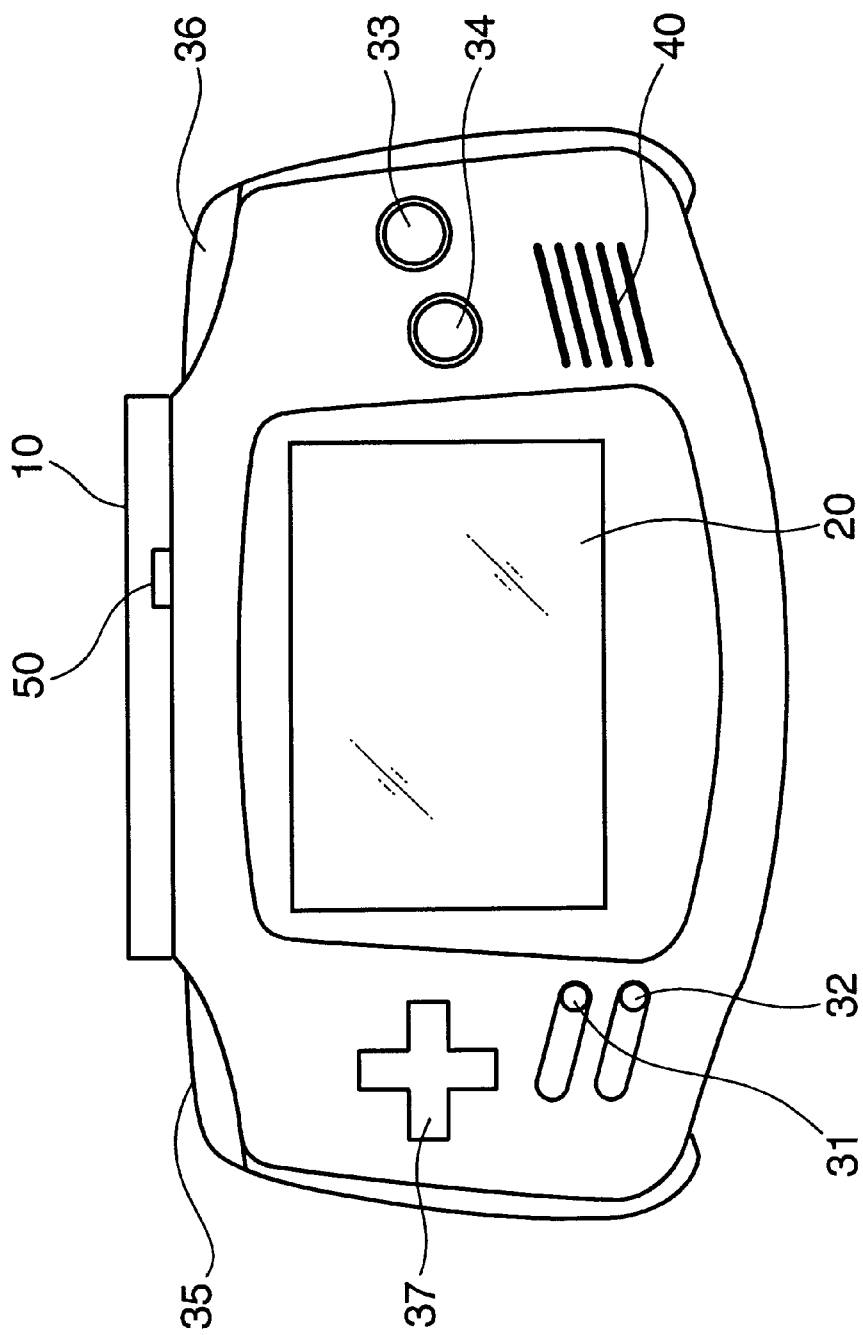
FIG. 1 is a figure showing an external view of a portable game device which is one aspect of the invention.

Below a portable game device, which is one aspect of the present invention, is explained, referring to the drawings.

Figure 2:
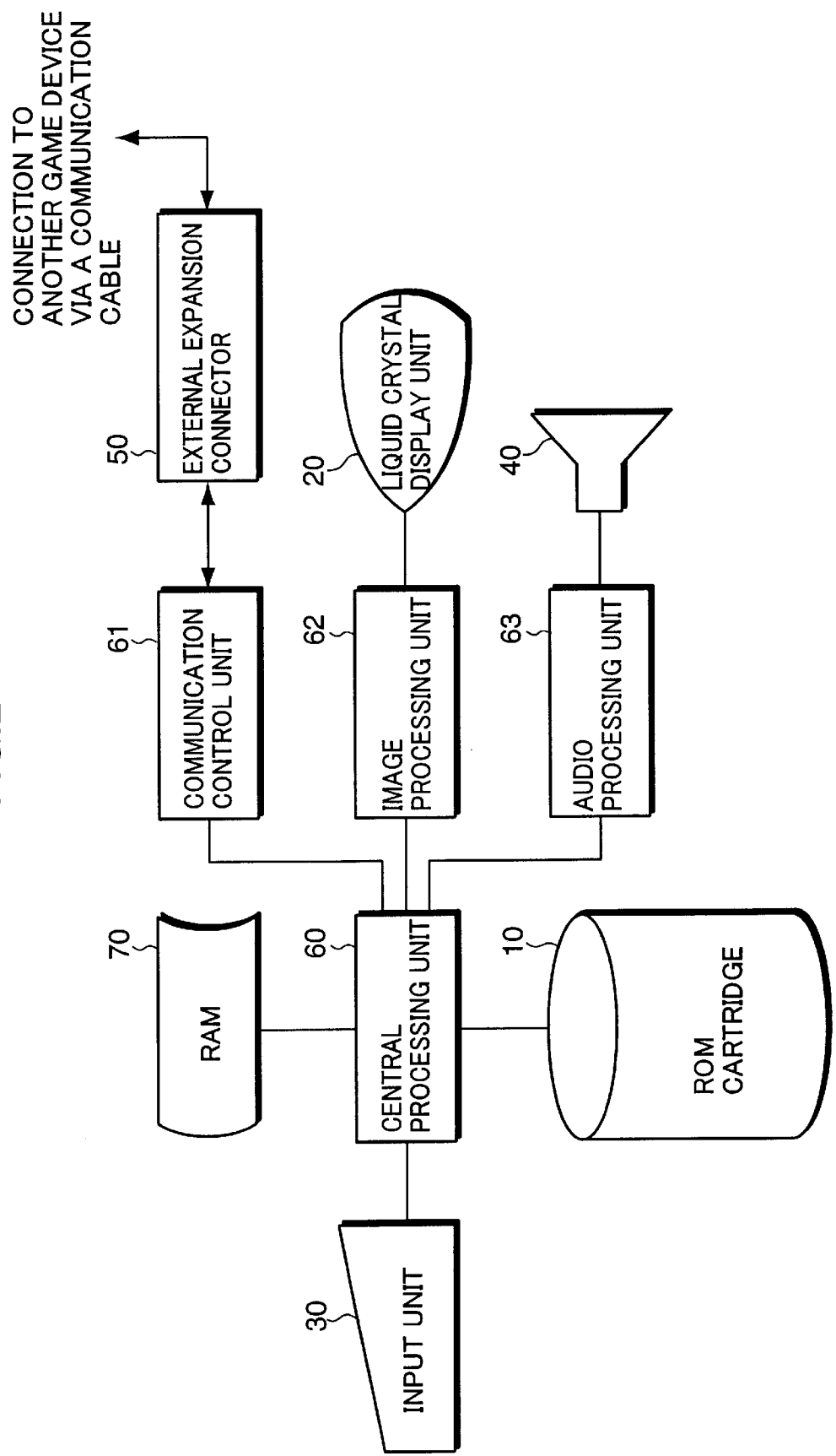
FIG. 2 is a block diagram showing in summary the configuration of the hardware of the portable game device.

FIG. 1 is a figure showing an external view of a portable game device which is one aspect of the present invention; FIG. 2 is a block diagram showing in summary the configuration of the hardware of the portable game device.

As shown in FIG. 1, when a specific game is played by a player, a mountable and removable ROM cartridge 10, on which are recorded the program for the game, as well as image data and sound data used by the program, is mounted in the portable game device. The game proceeds with input from the player accepted via the start button 31, select button 32, A button 33, B button 34, L button 35, R button 36, cross-shape button 37, and similar, based on the program in the ROM cartridge 10. Images are displayed via a liquid crystal display unit 20, and sounds are reproduced via a speaker 40, based on the image data and sound data. An external expansion connector 50 is also provided in this portable game device; by connecting the portable game device to another similar portable game device via a communication cable, and transmitting and receiving any necessary data, a single game can be advanced using two portable game devices.

Such game programs recorded on a ROM cartridge 10 are loaded into the RAM 70 shown in FIG. 2, and data generated during game execution is stored in the RAM 70 as necessary; game progress is controlled through execution in order the program in RAM 70 by the central processing unit (CPU) 60, while accepting input from the input unit 30, connected to the buttons 31 to 37. Processing specific to images is performed by the image processing unit 62, and images are displayed by the liquid crystal display unit 20; processing specific to sound is performed by the audio processing unit 63, and sounds are reproduced by the speaker 40. Data transmission and reception with the other portable game device, connected via the external expansion connector 50, is performed by the communication control unit 61.

In actuality, a competitive action game which mimics baseball proceeds with two baseball teams, associated with two portable game devices, alternating between offense and defense by means of the program on the ROM cartridges 10 mounted in each of the two portable game devices. During the game progress, instructions to a batter character mimicking a baseball batter are accepted by one of the portable game devices, and instructions to fielding characters mimicking baseball outfielders or infielders, and to a pitcher character mimicking a baseball pitcher, are accepted by the other of the portable game devices. Moving images of characters are displayed within a baseball field set virtually within the game space, based on these instructions, and sounds are reproduced to add excitement to the game sensation.

In such competitive action games mimicking baseball in which two portable game devices are connected, players compete on the basis of skillfulness in issuing instructions related to the behavior of the batter character (for example, predicting the trajectory of a pitched ball and swinging the bat), the behavior of the pitcher character (throwing the ball in the direction of the catcher, while selectively throwing strikes and balls), and the behavior of fielding characters (moving in the direction of progress of a batted ball, catching the ball, and throwing the ball to another fielder), corresponding to actual baseball plays. Further, control is exercised such that the number of balls and strikes, the number of outs, the score, and other values are counted similarly to actual baseball games based on the behavior of the various characters, and the players concentrate on the game and perform input according to the display, and acquire a unique sense of accomplishment in triumphing over the opposing baseball team.

This invention relates to the display which accompanies pitching instructions to the pitcher character in particular, using such portable game devices; below, pitch instruction input processing for the purpose of such display is explained in detail.

Figure 3:
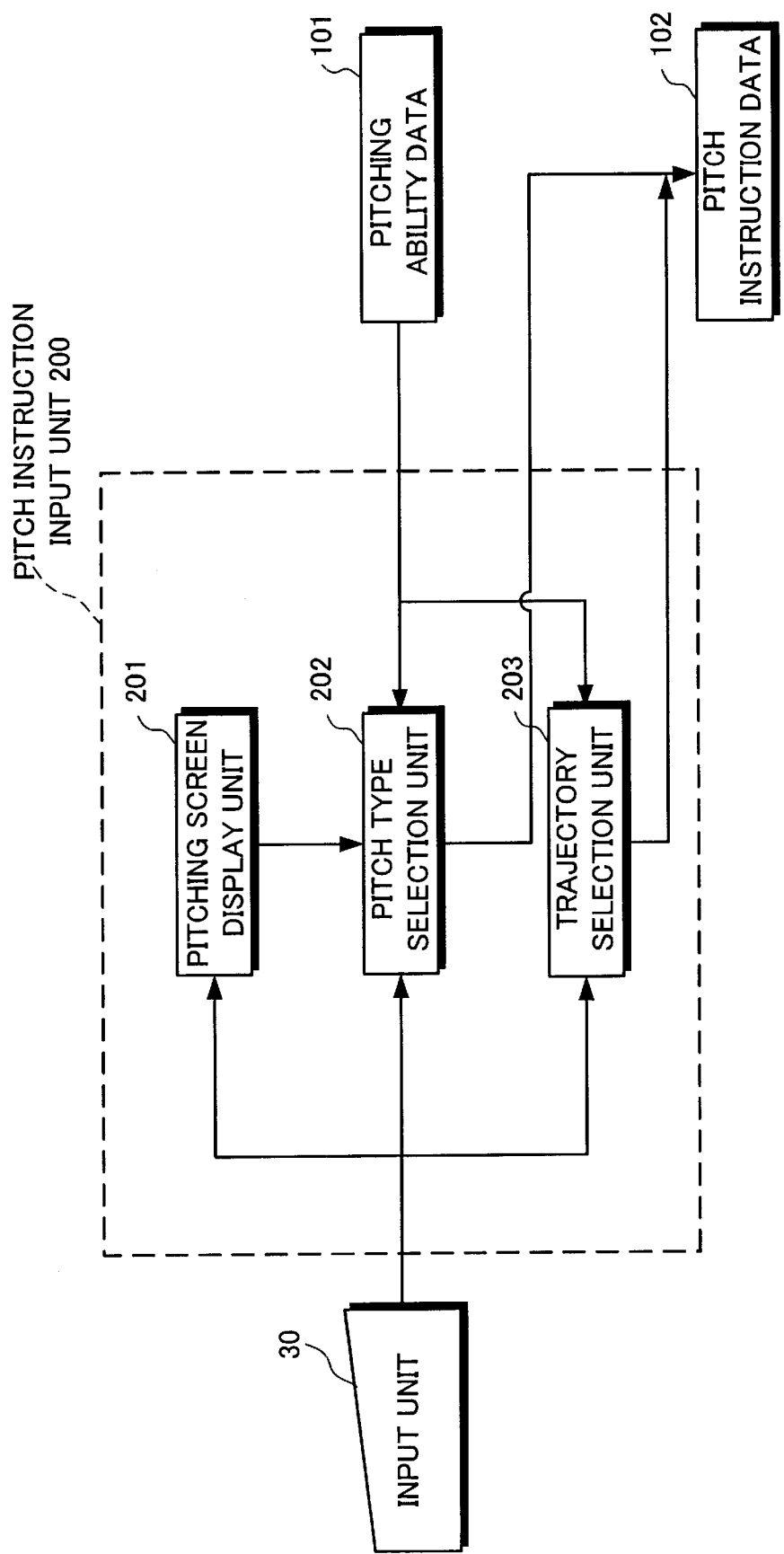
FIG. 3 is a block diagram showing the major portions comprised by the pitch instruction input unit (program to execute pitch instruction input processing) 200.
Figure 4:
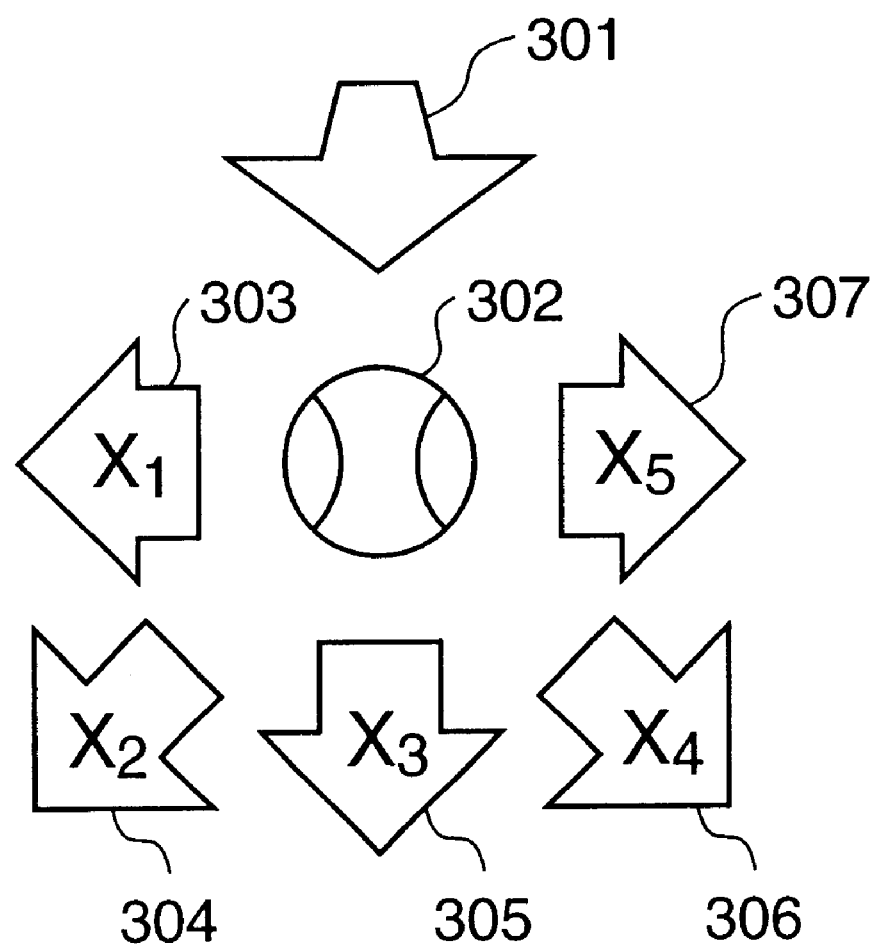
FIG. 4 is a figure used to explain display upon selection of a pitch type.

FIG. 3 is a block diagram showing the major portions comprised by the pitch instruction input unit (program to execute pitch instruction input processing) 200; FIG. 4 is a figure used to explain the display upon selection of a pitch type.

The pitch instruction input unit 200 (hereinafter also referred to as a ball movement type control unit) comprises a pitching screen display unit 201, which displays the pitching screen (the screen 400 shown in FIG. 6, except for the display related to pitch type), including the pitcher character and batter character, with a baseball field as background; a pitch type selection unit 202, which displays, in accordance with the pitching ability data 101 set for the pitcher character prior to its pitching, pitch types which can be thrown by the pitcher character and numerical values indicating the curve width of trajectories associated with each pitch type, and which has the player select a pitch type; and a trajectory selection unit 203, which has the player select a trajectory, while displaying the curve width corresponding to the selected pitch type by means of an icon indicating the target position (the position of the ball immediately before passing over home base) and the arrival position (the position of the ball when caught by the catcher). The pitch type, selected using the pitch type selection unit 202, and the trajectory, selected using the trajectory selection unit 203, are used as pitch instruction data 102 in the subsequent pitch display processing (processing to display the pitched ball, details of which are omitted). Note that the pitch type selection unit 202 and the trajectory selection unit 203 both combined are referred to as a ball movement type control section in the claim section.

When actually selecting an instruction relating to the pitch type for the pitcher character, as shown in FIG. 4, an icon 301 indicating a straight pitch and an icon 302 indicating a slowball, as well as one among a plurality of icons, including an icon indicating a screwball 303, an icon indicating a sinker 304, an icon indicating a forkball 305, an icon indicating a curveball 306, and an icon indicating a slider 307. Here two types of pitches, the straight ball and the slowball, are set as pitch types which can be thrown by all pitcher characters; five other types of pitches, the screwball, sinker, forkball, curveball, and slider, are set, by means of pitching ability data 101, as pitch types which can or cannot be selected. (More specifically, this pitching ability data 101 can be data relating to pitching abilities which is obtained selectively by a player from a prescribed database in which is stored data associated with actual professional baseball pitchers; or, it can be data relating to the pitching abilities of a virtual character which has been trained by the player in a prescribed character training game.)

Further, when a player selects a pitch type, only those icons corresponding to selectable pitch types are displayed as arrow-shape icons; also, a curve width indicating the degree of change in the trajectory is associated with the screwball, sinker, forkball, curveball, and slider, according to the properties of the pitcher character, and numeric values $X_1$ to $X_5$ indicating the curve width are displayed within each of the arrow-shape icons.

Figure 5:
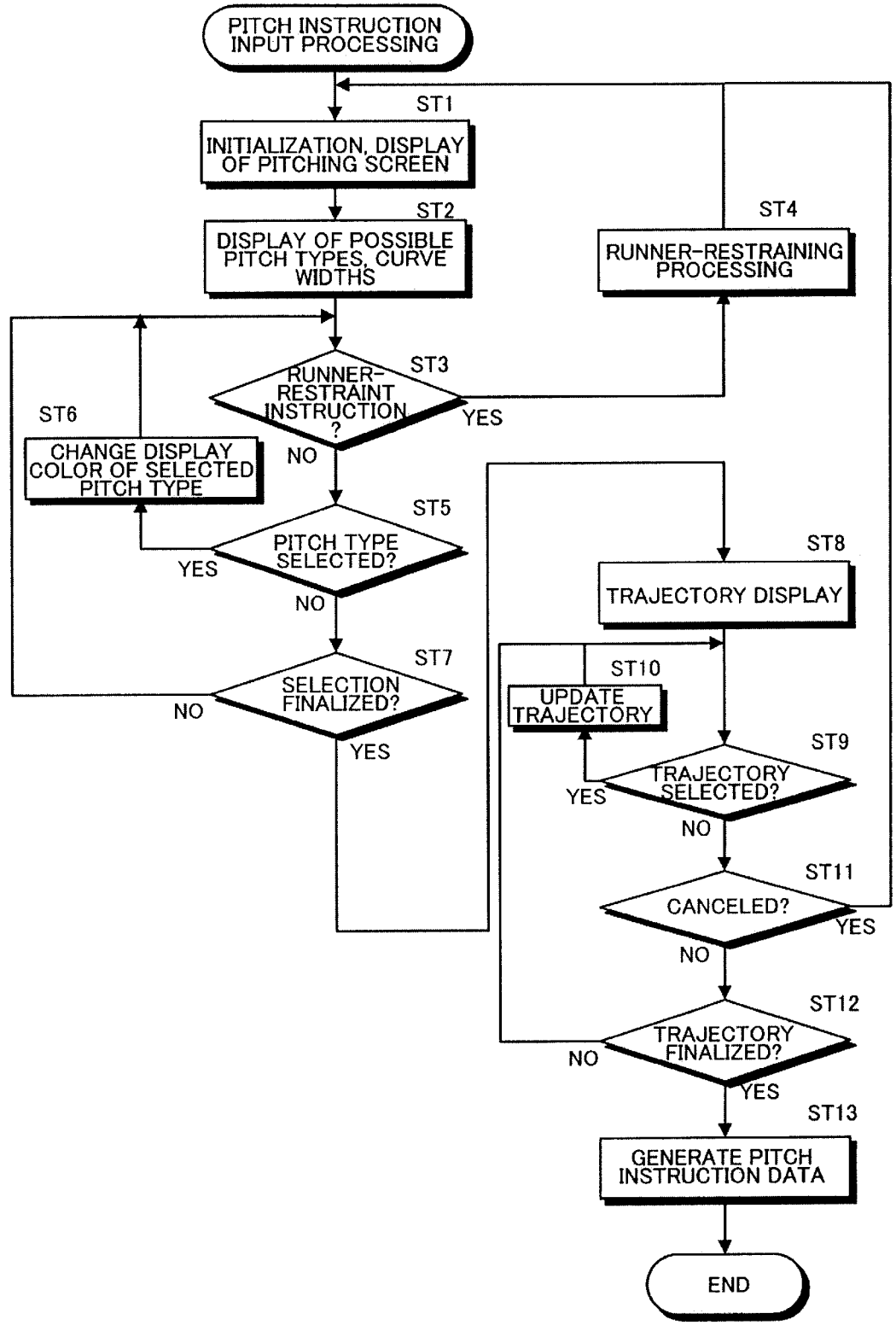
FIG. 5 is a flowchart showing the procedure for pitch instruction input processing.
Figure 6:
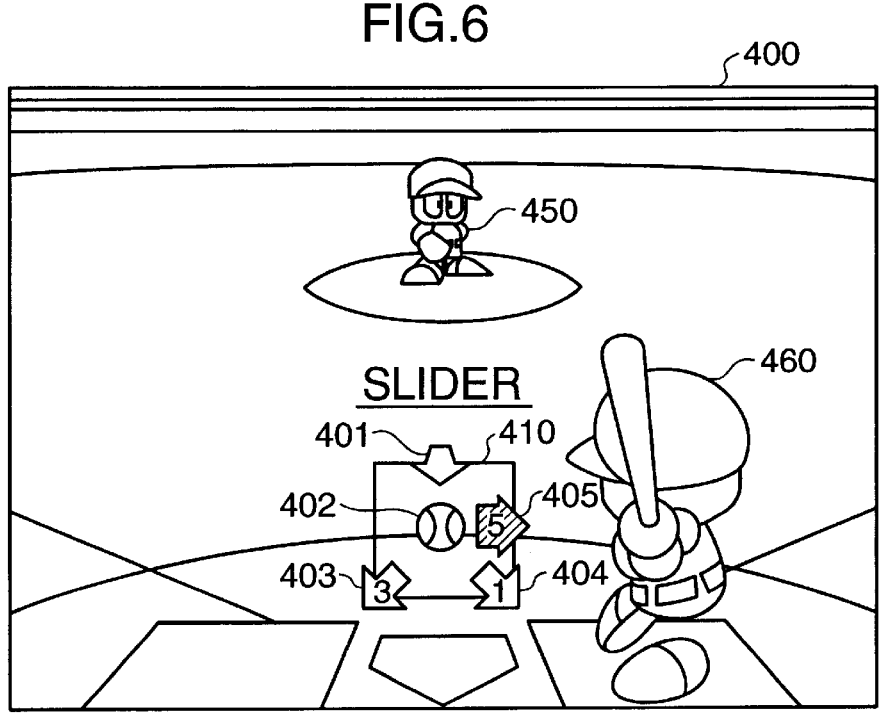
FIG. 6 is a figure showing the screen 400 displayed upon selection of the pitch type in ST5 of the pitch instruction input processing (FIG. 5); and, FIG. 7 is a figure showing the screen 500 displayed upon selection of the trajectory in ST9 of the pitch instruction input processing.
Figure 7:
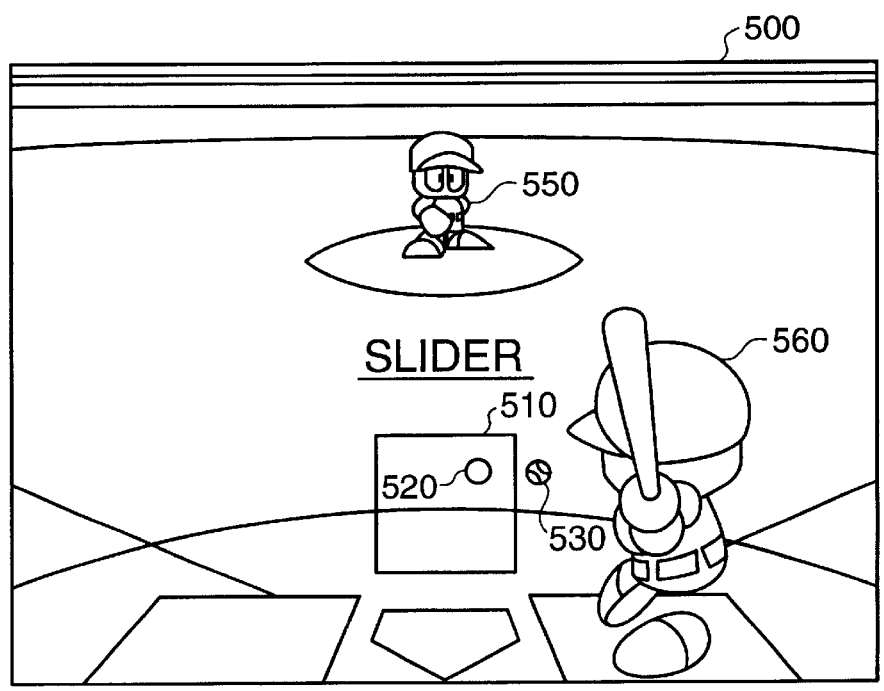

FIG. 5 is a flowchart showing the procedure for pitch instruction input processing. FIG. 6 is a figure showing the screen 400 displayed upon selection of the pitch type in ST5 of the pitch instruction input processing (FIG. 5), and FIG. 7 is a figure showing the screen 500 displayed upon selection of the trajectory in ST9 of the pitch instruction input processing.

As shown in FIG. 5, in pitch instruction input processing, first the pitch instruction data 102 (FIG. 3) and other data is initialized, and the pitching screen, including the pitcher character and batter character, is shown by the pitching screen display unit 201, in a state in which the slowball is initially selected (ST1). Next, the pitch type selection unit 202 shows the pitch types which can be thrown by the pitcher character, and curve widths (ST2).

When, in response to this display, depression of the B button 34 is detected ("YES" in ST3), runner-restraining processing is performed (ST4), in which a restraining throw from the pitcher character to a fielding character near first base, second base, or third base is displayed, and processing then returns to ST1.

When depression by the player of the cross-shape button 37, selectively indicating a direction, is detected ("YES" in ST5), the display color of the icon indicating the pitch type compatible with the selected direction is changed by the pitch type selection unit 202 (ST6), and this icon is displayed as the candidate for the selected pitch type. Then, if depression of the A button 33 is not detected ("NO" in ST7), processing returns to ST3, and if depression of the A button 33 is detected ("YES" in ST7), finalization of the selection is specified.

Next, an icon indicating the trajectory according to the finalized pitch type is displayed by the trajectory selection unit 203 (ST8), and when depression by the player of the cross-shape button 37, selectively indicating a direction, is detected ("YES" in ST9), the position of the icon indicating the trajectory is updated according to the selected direction (ST10), and if depression of the B button 34 is detected ("YES" in ST11), the pitch type and trajectory selection is canceled, and processing returns to ST1.

If, in response to the trajectory display, depression of the A button 33 is not detected ("NO" in ST12), processing returns to ST9; if depression of the A button 33 is detected ("YES" in ST12), the pitch type and trajectory specified by the above processing is finalized, and pitch instruction data 102 corresponding to the finalized pitch type and trajectory is generated (ST13); with this, pitch instruction input processing is concluded.

In actuality, the screen 400 shown in FIG. 6 is displayed upon the pitch type selection of ST5, and the player engaged in defense among the two players operating the two connected portable game devices is prompted to select a pitch type when pitching from the pitcher character 450 to the batter character 460. Here it is assumed that, in addition to straight and slowball pitches which are straight-line pitches, the pitcher character 450 is set by means of the pitching ability data 101 to be able to throw sinkers, curveballs and sliders, which are breaking pitches, with curve widths of 3, 1, and 5 respectively. Based on pitching ability data 101 set in this way, in addition to the icons 401, 402 indicating a straight pitch and a slowball, icons 403, 404, 405 to indicate a sinker, a curveball, and a slider respectively are displayed near the strike zone display 410.

In particular, the oblique lines on the icon 405 indicating a slider show that the display color is changed accompanying depression by the player, from the state of slowball selection, of the cross-shape button 37 in the bottom-right direction. Thereafter, by further pressing the A button 33, the pitch type selection is finalized. (The word "slider" is displayed in the center of the screen accompanying depression of the cross-shape button 37.)

The screen 500 shown in FIG. 7 is displayed upon selection of the trajectory in ST9, and the player engaged in defense is prompted to select a trajectory for a pitch from the pitcher character 550 to the batter character 560. Here it is assumed that through input to the above screen 400, the pitch type has been finalized as a slider; by gradually moving the icon 520 indicating the target position (and the icon 530 indicating the arrival position) in accordance with depression of the cross-shape button 37, the player can confirm the pitch trajectory.

The distance from the icon 520 indicating the target position to the icon 530 indicating the arrival position changes according to the pitching ability (the curve width described above); then, by depressing the A button 33, the trajectory selection is finalized.

As explained above, in a portable game device in which a competitive game which mimics baseball competition is controlled, icons 303 to 307 (FIG. 4) are selectively displayed according to pitching ability (pitch types and curve width), based on pitching ability data associated with the pitcher character and stored prior to pitch instruction input processing, and among the displayed icons, the display color of one of the icons is changed according to presses of the cross-shape button 37. When this is followed by depression of the A button 33, the pitch instruction corresponding to the pitch type icon the display color of which is changed, is finalized.

In such a competitive game, the player reliably understands the state of abilities (relating to pitch types and curve widths) of the pitcher character, and inputs pitch instructions based on this, so that erroneous input of pitch instructions, such as occurs in conventional competitive games, is prevented.

The competitive action game of the above-described aspect mimics baseball; however, this invention can be applied to control over the input of instructions relating to ball movement in competitive action games which mimic, for example, soccer, volleyball, tennis, or other games involving balls.

In the competitive action game of the above aspect, it was assumed that pitch types are selected using a cross-shape button 37; however, pitch type candidates can be changed in order according to the number of presses of the A button 33 (with the candidate of the pitch type to be pitched changed in order, from the icon 401 to the icon 405, each time the A button 33 is pressed), and the display color of the icon corresponding to the pitch types changed in response (or the display mode is changed, through shading or oblique lines on the icon). Further, by changing the mode of input of the same button, as for example with a single depression of the A button 33 and two consecutive depressions of the A button 33, a change in the candidate pitch type, or finalization of the pitch type, can be specified selectively.

In a competitive action game of the above aspect, numerical values indicating curve widths are displayed within arrow-shape icons; however, characters other than numeric values, such as L, M, S for "large", "medium", "small", may be displayed instead to indicate magnitude.

Further, when selecting the pitch type, the player can be made to input the curve width magnitude, with a numeric value indicated by the pitching ability data as the maximum value. By this means, realistic pitching instructions can be issued.

In summary, the present invention relates to a computer-readable recording media recording an action game program which causes a game player to experience action in simulation, the action game program comprising the steps of: reading ability data including a plurality of abilities of the game character regarding movement of the ball; controlling trajectory of the ball according to the ability data; displaying the ball as it moves while changing the trajectory and icons corresponding to said plurality of abilities of the game character to control the movement of the ball; and allowing the game player to select one of said icons to input instruction relating to said movement of the ball.

By means of the invention as described in the above, the player is prompted to input instructions relating to movement of the ball while icons corresponding to different abilities are displayed, based on stored ability data, so that, as the player has a firm understanding of the state of character abilities, erroneous input can be prevented when the player inputs instructions which are likely to vary according to the state of abilities.

In addition, the mode of display of one of the icons among the plurality of displayed icons may be set to change in response to depression of a first type of button, and selection of the ability of the icon display mode of which is changed can be finalized in response to depression of a second type of button.

With the aforementioned feature, instructions relating to movement of the ball are input in response to icon display as described above, so that, as the player has a firm understanding of the state of character abilities, erroneous input can be prevented when issuing pitching instructions.

Furthermore, said abilities may be preferably associated with the pitch types which can be thrown by a baseball pitcher character, and with a curve width indicating the magnitude of the change in trajectory of the ball according to the pitch type; and said icons can be shaped as arrows indicating the direction of the trajectory change of the ball according to the pitch type, and inside the icons can be characters indicating the curve width.

With the above feature, erroneous input of pitching instructions can be prevented, as the player has a firm understanding of the state of abilities of a character mimicking a baseball pitcher in particular, and the types of pitches and curve widths which can be thrown.

This application is based on Japanese Patent Application Serial No. 2001-004812 filed in Japan Patent Office on Jan. 12, 2001, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A computer-readable recording media recording an action game program involving game characters which causes a game player to experience action in simulation, the action game program comprising the steps of:

reading ability data including discrete sets of abilities regarding movement of a ball, each of said discrete sets of abilities being independently assigned to a corresponding one of said game characters;

controlling trajectory of the ball according to the ability data;

displaying the ball as it moves while changing the trajectory and icons corresponding to plurality a one of said discrete sets of abilities corresponding to a particular one of the game characters to control the movement of the ball; and allowing the game player to select one of said icons to input instruction relating to said movement of the ball.

2. The computer-readable recording media according to claim 1, wherein the mode of display of one of the icons among the plurality of displayed icons changes in response to depression of a first type of button, and selection of the ability of the icon the display mode of which is changed is finalized in response to depression of a second type of button.

3. The computer-readable recording media according to claim 2, wherein said abilities are associated with the pitch types which can be thrown by a baseball pitcher character, and with a curve width indicating the magnitude of the change in trajectory of the ball according to the pitch type; and said icons are shaped as arrows indicating the direction of the trajectory change of the ball according to the pitch type, and inside the icons are characters indicating the curve width.

4. The computer-readable recording media according to claim 1, wherein said abilities are associated with the pitch types which can be thrown by a baseball pitcher character, and with a curve width indicating the magnitude of the change in trajectory of the ball according to the pitch type; and said icons are shaped as arrows indicating the direction of the trajectory change of the ball according to the pitch type, and inside the icons are characters indicating the curve width.

5. The computer-readable recording media according to claim 4, further comprising the step of displaying a first icon indicating a target position of the ball to be thrown to from a first game character and a second icon indicating an arrival position of the ball to fly in a vicinity of a second character.

6. The computer-readable recording media according to claim 5, wherein the amount of the displacement between the first icon and the second icon substantially corresponds to the curve width.

7. A computer-readable recording media recording an action game program which causes a game player to experience action in simulation, the action same program comprising the steps of:

reading ability data including a plurality of abilities of a game character regarding movement of a ball;

controlling trajectory of the ball according to the ability data;

displaying the ball as it moves while changing the trajectory and icons corresponding to said plurality of abilities of the game character to control the movement of the ball;

changing a mode of display of one of the icons among the plurality of displayed icons in response to depression of a first type of button;

allowing the game player to select one of said icons to input instruction relating to said movement of the ball; and finalizing selection of the ability of said one of said icons the display mode of which is changed in response to depression of a second type of button.

8. The computer-readable recording media according to claim 7, wherein said abilities are associated with the pitch types which can be thrown by a baseball pitcher character, and with a curve width indicating the magnitude of the change in trajectory of the ball according to the pitch type; and said icons are shaped as arrows indicating the direction of the trajectory change of the ball according to the pitch type, and inside the icons are characters indicating the curve width.

9. A computer-readable recording media media recording an action game program which causes a game player to experience action in simulation, the action game program comprising the steps of:

reading ability data including a plurality of abilities of a game character regarding movement of a ball, said abilities being associated with pitch types which can be thrown by a baseball pitcher character, controlling trajectory of the ball according to the ability data, a curve width indicating the magnitude of the change in trajectory of the ball according to the pitch type;

displaying the ball as it moves while changing the trajectory and icons corresponding to said plurality of abilities of the game character to control the movement of the ball, said icons being shaped as arrows indicating the direction of the trajectory change of the ball according to the pitch type, and inside the icons are characters indicating the curve width; and allowing the game player to select one of said icons to input instruction relating to said movement of the ball.

10. The computer-readable recording media according to claim 9, further comprising the step of displaying a first icon indicating a target position of the ball to be thrown to from a first game character and a second icon indicating an arrival position of the ball to fly in a vicinity of a second character.

11. The computer-readable recording media according to claim 5, wherein the amount of the displacement between the first icon and the second icon substantially corresponds to the curve width.

12. An action game control device, which controls an action game which causes a player to experience action in simulation, comprising:

a ball movement control unit including:

a ball movement type control section for reading ability data including a plurality of abilities of the game character regarding a movement of ball to control trajectory of the ball according to the ability data; and a display section for displaying the ball as it moves while changing the trajectory and icons corresponding to said plurality of abilities of the game character;

an input unit for allowing the game player to select one of said icons to input instruction relating to said movement of the ball;

means for changing a mode of display of one of the icons among the plurality of displayed icons in resoonse to depression of a first type of button; and means for finalizing selection of the ability of said one of the icons the display mode of which is changed in response to depression of a second type of button.

13. An action game control method, which controls an action game which causes a player to experience action in simulation, said control method comprising the steps of:

reading ability data including a plurality of abilities of the game character regarding movement of a ball;

controlling trajectory of the ball according to the ability data;

displaying the ball as it moves while changing the trajectory and icons corresponding to said plurality of abilities of the game character to control the movement of the ball;

allowing the game player to select one of said icons to input instruction relating to said movement of the ball;

changing a mode of display of one of the icons among the plurality of displayed icons in response to depression of a first type of button; and finalizing selection of the ability of said one of the icons the display mode of which is changed in resoonse to depression of a second type of button.

14. An action game program which causes a game player to experience action in simulation, the action game program comprising the steps of:

reading ability data including a plurality of abilities of the game character regarding movement of a ball;

controlling trajectory of the ball according to the ability data;

displaying the ball as it moves while changing the trajectory and icons corresponding to said plurality of abilities of the game character to control the movement of the ball;

allowing the game player to select one of said icons to input instruction relating to said movement of the ball;

changing a mode of display of one of the icons among the plurality of displayed icons in response to depression of a first type of button; and finalizing selection of the ability of said one of the icons the display mode of which is changed in response to depression of a second type of button.

* * * * *